Sept. 10, 1929. M. D. MENDLE 1,727,515
ROTARY DISPLAY RACK
Filed Oct. 24, 1927
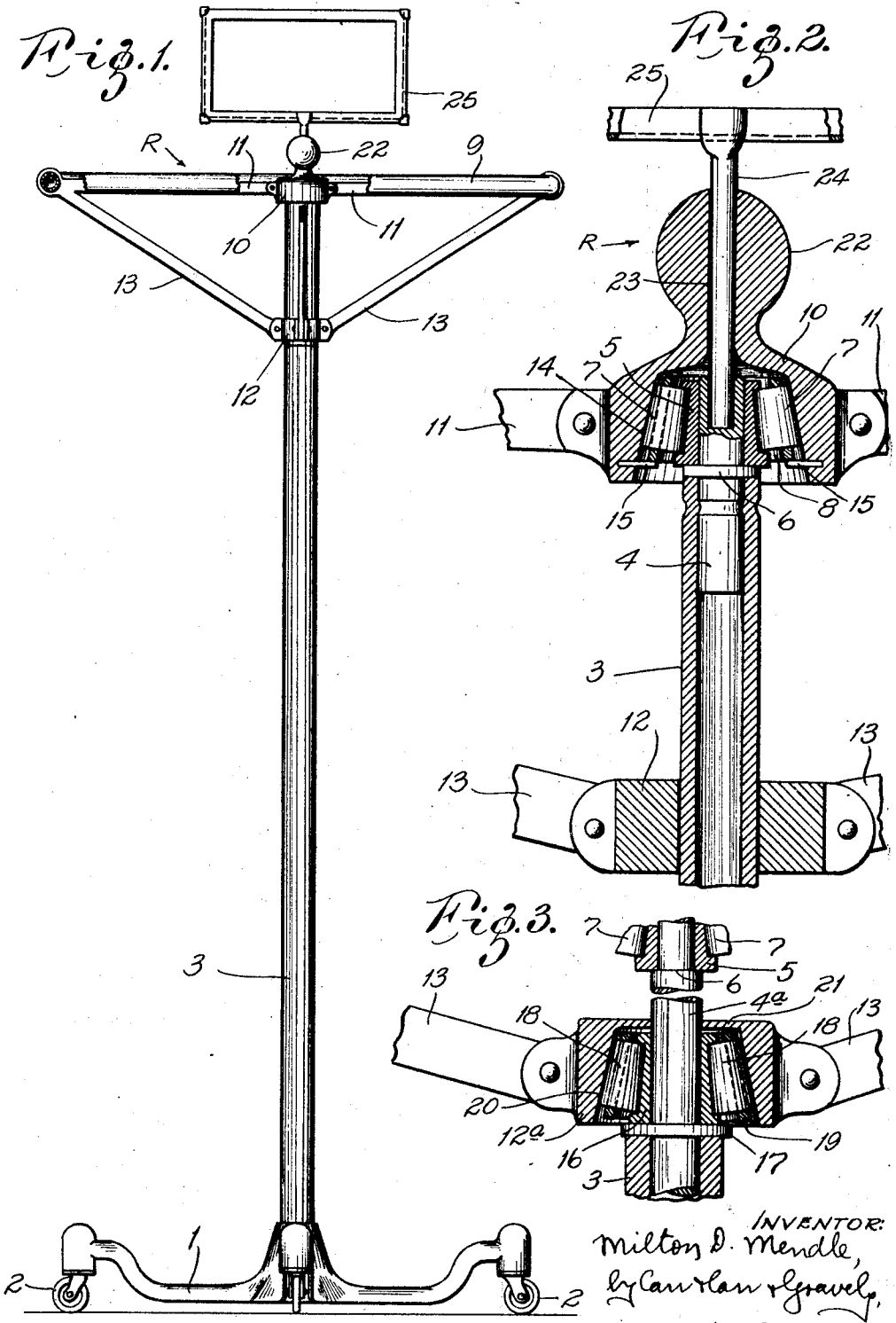

Patented Sept. 10, 1929.

1,727,515

UNITED STATES PATENT OFFICE.

MILTON D. MENDLE, OF ST. LOUIS, MISSOURI, ASSIGNOR TO AMERICAN FIXTURE & SHOWCASE MFG. CO., OF ST. LOUIS, MISSOURI, A CORPORATION OF MISSOURI.

ROTARY DISPLAY RACK.

Application filed October 24, 1927. Serial No. 228,159.

My invention relates to rotary display racks for displaying garments and the like. It has for its principal object a display rack in which the rotary garment supporting member is very easily rotatable. A further principal object is a display rack wherein a price tag or the like may be mounted at the top of the rack in such a way as to not rotate. The invention consists principally in a rotary display rack in which the rotary portion is mounted on one or more antifriction bearings.

The invention also consists in the rotary display rack and in the parts and combinations and arrangement of parts hereinafter described and claimed.

In the accompanying drawing,

Fig. 1 is an elevation of a rotary display rack embodying my invention;

Fig. 2 is a fragmentary vertical sectional view showing a single antifriction bearing for supporting the rotary member; and Fig. 3 is a similar sectional view showing two antifriction bearings for supporting a rotary member.

A base 1 is provided with caster wheels 2 whereby the display rack may be easily moved. Secured to the base 1 is a standard 3 which may be a hollow tube. At the top of said standard 3 is a spindle portion 4 which may be in the form of a plug secured in the end of the hollow tubular member 3. Mounted at the top of said spindle portion 4 is a cone or inner bearing member 5 of a taper roller bearing, said cone 5 being disposed with its large end downward and abutting against a shoulder 6 on said spindle portion. Mounted on said cone 5 is a series of conical rollers 7 held by a suitable cage 8.

The rotary display member R comprises a rim member 9, an upper hub member 10 connected to said rim by spokes 11 and a lower hub member 12 connected to said rim by inclined spokes 13 or spider arms. The upper hub member 10 has a conical bore 14 adapted to fit the conical rollers 7 and act as a raceway therefor. The hub member 10 is provided with inwardly projecting pins 15 extending under the edge of the bearing cage 8 to support it.

In the construction shown in Fig. 2, the lower hub member 12 has a plain bore and acts as an ordinary bushing sleeve for the standard 3.

In the construction shown in Fig. 3, a bearing cone 16 is mounted large end down against a shoulder 17 at the bottom of the spindle portion 4ª and has conical bearing rollers 18 thereon mounted in a cage 19. The lower hub member 12ª shown in Fig. 3 has a conical bore 20 that serves as a raceway for the rollers. The top 21 of said hub portion 12ª covers the bearing cone 16 and rollers 18 and closely fits the spindle portion 4ª.

The upper hub member 10 has an upwardly projecting ornamental boss 22 that serves as a cover for the upper antifriction bearing. Said boss 22 is provided with a vertical bore 23 through which extends a pin 24 whose lower end is mounted in the top of said spindle portion 4 of the standard 3. Secured to the top of said pin 24 is a frame 25 in which may be mounted a suitable display tag or price tag. Since said pin 24 is secured to the nonrotatable spindle member 4, said pin and price tag will not rotate when the rotary member R is rotated.

The rotary member may be easily removed from the standard. The pins cause the roller bearing in Fig. 2 to be removed with the rotary member. In the construction shown in Fig. 3, the upper roller bearing is removed with the rotary member because of the engagement of said pins with the bearing cage, but the lower roller bearing remains on the spindle, from which is may be easily removed.

The above invention provides a display rack that may be easily turned, no matter how heavy a load is carried by the rotary member thereof. The price tag is mounted so as not to rotate, thus making it readable even though the rotary member is turned.

What I claim is:

1. A rotary display rack comprising a standard, a bearing cone loosely mounted thereon, conical rollers on said cone, a cage holding said rollers on said cone and a rotary member having a hub portion fitting over said rollers and serving as an outer raceway therefor.

2. A rotary display rack comprising a standard, a bearing cone loosely mounted thereon, conical rollers on said cone, a cage holding said rollers on said cone and a rotary member having a hub portion fitting over said rollers and serving as an outer raceway therefor, said rotary member also having a lower hub portion mounted on said standard.

3. A rotary display rack comprising a standard having a spindle portion at the top thereof, a bearing cone loosely mounted on the lower end of said spindle portion with its large end downward and seated against a shoulder provided therefor on said spindle portion, conical bearing rollers on said bearing cone, a cage holding said rollers on said cone, a second bearing cone loosely mounted at the top of said spindle portion with its large end downward and seated against a shoulder provided therefor at the top of said spindle portion, bearing rollers on said upper bearing cone, a cage holding said rollers on said upper cone and a rotary display rim member having hub portions with upper and lower conical bores fitting over the upper and lower bearing rollers respectively.

4. A rotary display rack comprising a hollow standard having a spindle portion inserted in the top thereof, and projecting thereabove a bearing cone loosely mounted on the lower end of said spindle portion with its large end downward and seated against a shoulder on said spindle portion, conical bearing rollers on said bearing cone, a cage holding said rollers on said cone, a bearing cone loosely mounted at the top of said spindle portion with its large end downward, bearing rollers on said upper bearing cone, a cage for said rollers, a rotary display rim member having hub portions with conical bores fitting over the respective bearing rollers, and pins in said upper hub portion overlapping the lower edge of said cage.

Signed at St. Louis, Missouri, this 21st day of October, 1927.

MILTON D. MENDLE.